United States Patent
Underwood et al.

(10) Patent No.: US 9,915,106 B2
(45) Date of Patent: Mar. 13, 2018

(54) U-JOINT FOR A DOWNHOLE MOTOR DRIVE SHAFT

(71) Applicant: Smith International, Inc., Houston, TX (US)

(72) Inventors: Lance D. Underwood, Morrison, CO (US); Eric T. Johnson, Sugar Land, TX (US); Thomas Oskamp, Houston, TX (US)

(73) Assignee: SMITH INTERNATIONAL, INC., Houston, TX (US)

( * ) Notice: Subject to any disclaimer, the term of this patent is extended or adjusted under 35 U.S.C. 154(b) by 0 days.

(21) Appl. No.: 14/776,491

(22) PCT Filed: Mar. 13, 2014

(86) PCT No.: PCT/US2014/025901
§ 371 (c)(1),
(2) Date: Sep. 14, 2015

(87) PCT Pub. No.: WO2014/151518
PCT Pub. Date: Sep. 25, 2014

(65) Prior Publication Data
US 2016/0040484 A1 Feb. 11, 2016

Related U.S. Application Data

(60) Provisional application No. 61/790,478, filed on Mar. 15, 2013.

(51) Int. Cl.
*F16D 3/16* (2006.01)
*E21B 17/05* (2006.01)
(Continued)

(52) U.S. Cl.
CPC ............... *E21B 17/05* (2013.01); *E21B 4/02* (2013.01); *E21B 17/20* (2013.01); *F16C 23/048* (2013.01);
(Continued)

(58) Field of Classification Search
CPC . E21B 17/05; E21B 4/02; E21B 17/20; F16C 23/048; F16C 33/121; F16D 3/20; F16D 3/34
(Continued)

(56) References Cited

U.S. PATENT DOCUMENTS 1,112,869 A * 10/1914 Tirrell ................... F16D 3/221
464/152
4,772,246 A 9/1988 Wenzel
(Continued)

FOREIGN PATENT DOCUMENTS

| CA | 2541339 A1 | 9/2007 |
|----|-----------|--------|
| CA | 2646968 A1 | 10/2009 |

(Continued)

OTHER PUBLICATIONS

International Search Report for International Application No. PCT/US2014/025901 dated Jul. 3, 2014.
International Preliminary Report on Patentability issued in International patent application PCT/US2014/025901 dated Sep. 15, 2015. 14 pages.

*Primary Examiner* — Gregory J Binda

(57) ABSTRACT

A downhole motor drive shaft assembly includes a drive shaft having a longitudinal rotational axis, a plurality of drive key sockets, an end housing having a longitudinal rotational axis, a plurality of circumferentially spaced axial keyways, and a concave spherical thrust bearing surface, and a drive key operatively connecting each drive key socket with a respective axial keyway for transferring torque from the drive shaft to the end housing. The drive key includes a substantially planar drive face slidably engaging the axial (Continued)

keyway, and a radiused, cylindrical back portion rotatably engaging the drive key socket, the substantially planar drive face and radiused, cylindrical back portion forming a nominal half-circle.

21 Claims, 15 Drawing Sheets

(51) Int. Cl.
| | |
|---|---|
| *E21B 17/20* | (2006.01) |
| *E21B 4/02* | (2006.01) |
| *F16D 3/20* | (2006.01) |
| *F16C 23/04* | (2006.01) |
| *F16C 33/12* | (2006.01) |
| *F16D 3/34* | (2006.01) |

(52) U.S. Cl.
CPC .............. *F16C 33/121* (2013.01); *F16D 3/20* (2013.01); *F16D 3/34* (2013.01)

(58) Field of Classification Search
USPC .................................................. 464/110, 152
See application file for complete search history.

(56) References Cited

U.S. PATENT DOCUMENTS

| | | |
|---|---|---|
| 5,267,905 A | 12/1993 | Wenzel et al. |
| 5,368,398 A | 11/1994 | Damm et al. |
| 6,203,435 B1 | 3/2001 | Falgout, Sr. |
| 6,309,195 B1 | 10/2001 | Bottos et al. |
| 7,186,182 B2 | 3/2007 | Wenzel et al. |
| 7,360,609 B1 | 4/2008 | Falgout, Sr. |
| 7,445,061 B1 | 11/2008 | Falgout, Sr. et al. |
| 8,025,110 B2 | 9/2011 | Falgout, Jr. et al. |
| 8,033,917 B2 | 10/2011 | Prill et al. |
| 8,062,140 B2 | 11/2011 | Wall et al. |
| 2005/0272507 A1 | 12/2005 | Wenzel et al. |
| 2009/0275415 A1 | 11/2009 | Prill et al. |
| 2010/0313692 A1 | 12/2010 | Wenzel |

FOREIGN PATENT DOCUMENTS

| | | | |
|---|---|---|---|
| SU | 1434165 A1 * | 10/1988 | .................... 464/152 |
| WO | 2012039700 A1 | 3/2012 | |
| WO | 2014126889 A2 | 8/2014 | |
| WO | 2014144256 A1 | 9/2014 | |
| WO | 2014151518 A1 | 9/2014 | |

* cited by examiner

U-JOINT FOR A DOWNHOLE MOTOR DRIVE SHAFT

BACKGROUND

Directional drilling, such as for the recovery of hydrocarbons or minerals from a subsurface formation, is typically carried out using a downhole motor (also commonly referred to as a "drilling motor" or "mud motor"), which is incorporated into the drill string above the drill bit. A downhole motor may include several primary components (in order, starting from the top of the downhole motor assembly): a top sub adapted to facilitate connection to the lower end of a drill string ("sub" being the common general term in the oil and gas industry for any small or secondary drill string component); a power section; a drive shaft enclosed within a drive shaft housing, with the upper end of the drive shaft being operably connected to the rotor of the power section; and a bearing assembly, which may include a mandrel with an upper end coupled to the lower end of the drive shaft, plus a lower end adapted to receive a drill bit or other components attached to a drill bit.

During operation of the downhole motor, high-pressure drilling fluid is forced through the power section, causing the rotor to rotate within the stator. As the drill bit engages the formation for drilling, torque is then required to turn the bit against the formation. This reactive torque induces a pressure drop across the power section (i.e., the drilling fluid pressure being lower at the bottom, or output end, of the power section than at the top, or input end, of the power section). The power thus delivered to the rotor output shaft is proportional to the product of the volume of fluid passing through the power section multiplied by the pressure drop across the power section (i.e., from fluid inlet to fluid outlet). Further, the power delivered to the rotor output shaft is proportional to the product of the rotational speed of the rotor and the torque required to rotate the drill bit. Accordingly, a higher rate of fluid circulation fluid through the power section will result in a higher rotational speed of the rotor within the stator, and correspondingly higher power output. Likewise, for a given rotor speed, higher torque output also results in a correspondingly higher output power.

The output shaft of the power section rotor is coupled to the upper end of the drive shaft, for transmission of rotational torque to turn the drill bit. However, the motion of the rotor in a positive displacement-type downhole motor is eccentric in nature, or "precessional." In operation, the longitudinal axis of the rotor precesses, or orbits, about the longitudinal axis of the stator housing with rotor axis and the stator axis remaining parallel with each other. At the same time, the rotor also rotates about its own longitudinal axis. This description applies to a positive displacement motor commonly referred to as a "Moineau" motor; however, the term "downhole motor" is not limited to positive displacement motors and may include, for example, turbodrills, in which the rotor motion is concentric.

The output shaft of the rotor is operationally coupled to the upper end of the drive shaft by way of a first (or upper) universal joint, whereby rotation and torque can be transferred from the rotor to the drive shaft irrespective of the fact that the rotor and drive shaft axes may be non-collinear.

In recent years, power sections have been introduced that generate very high-torque. These include "even-wall" stators such as the ERT series offered by Robbins & Myers, and hard rubber (HR) stators such as those offered by Dyna-Drill. Higher torque results from the ability of these power sections to withstand higher operating pressures and pressure drops. Necessarily, the operating pressure of these power sections also produces high axial thrust. Typical prior art universal joints, an example of which is found in U.S. Pat. No. 5,267,905, use ball bearings to transmit both torque and thrust. The bearing(s) used in the universal joints as drive elements to transmit torque must endure high loads and a fretting motion, which create point contact and high Hertzian stresses that may cause the mating materials to yield or spall. Also, when used as thrust bearings, ball bearings and their mating thrust seats may suffer galling because the thrust balls must be relatively small, because they are positioned under, and in the same plane with, the drive elements. Spalling and galling are destructive occurrences that can lead to costly failure of the universal joint, and thus, of the entire mud motor.

SUMMARY OF THE DISCLOSURE

Drive shaft assemblies and the associated universal joints disclosed herein may carry both the thrust load and the torque load required by modern mud motor power sections, which may cause contact stress on the bearing sections (thrust and/or torque carrying elements) that may be well over 20,000 psi.

In one aspect, embodiments disclosed herein relate to a downhole motor drive shaft assembly. The assembly includes a drive shaft having a first end, a second end, a longitudinal rotational axis, and a thrust insert socket located proximate one of the first end and the second end, an end housing having a longitudinal rotational axis and a concave spherical thrust bearing surface, a thrust bearing insert disposed within the thrust insert socket and a convex spherical surface in mating engagement with the concave spherical thrust bearing surface of the end housing, a mechanism for transferring torque from the drive shaft to the end housing, the mechanism for transferring torque configured to be operationally effective irrespective of any relative angular offset between the rotational axes of the drive shaft and the end housing over a selected angular range, and the torque transferring mechanism comprising a plurality of drive keys with a planar front face and a cylindrical back face, the two faces forming a nominal half-circle. The thrust bearing insert includes a material selected from the group consisting of a copper-nickel-tin alloy, an iron-chromium-nickel-manganese-silicon alloy, a copper-beryllium alloy, a cobalt-chromium-tungsten-carbon alloy, a copper-chromium-molybdenum alloy, a copper-chromium-nickel-molybdenum-iron-tungsten alloy, and a nickel-beryllium alloy.

In another aspect, embodiments disclosed herein relate to a downhole motor drive shaft assembly. The assembly includes a drive shaft having a first end, a second end, a longitudinal rotational axis, a plurality of drive key sockets, and a thrust insert socket located proximate one of the first end and the second end, an end housing having a longitudinal rotational axis, a plurality of circumferentially spaced axial keyways, and a concave spherical thrust bearing surface, a thrust bearing insert comprising a stem portion disposed within the thrust insert socket and a convex spherical surface in mating engagement with the concave spherical thrust bearing surface of the end housing, and a drive key operatively connecting each drive key socket with a respective axial keyway for transferring torque from the drive shaft to the end housing. The drive key includes a substantially planar drive face slidably engaging the axial keyway, and a radiused, cylindrical back portion rotatably engaging the drive key socket, the substantially planar drive face and radiused, cylindrical back portion forming a nominal half-circle. The drive key provides for transfer of torque between the drive shaft and the end housing irrespective of any relative angular offset between the rotational axes of the drive shaft and the end housing over a selected angular range.

In another aspect, embodiments disclosed herein relate to a downhole motor drive shaft assembly. The assembly includes a drive shaft having a first end, a second end, a longitudinal rotational axis, with only a first drive key socket, a second drive key socket, and a third drive key socket formed therein, an end housing having a longitudinal rotational axis with only a first keyway, a second keyway, and a third keyway formed therein, the first keyway, the second keyway, and the third keyway circumferentially spaced from each other, and a first drive key, a second drive key, and a third drive key for transferring torque from the drive shaft to the end housing, the first drive key operatively connecting the first drive key socket with the first keyway, the second drive key operatively connecting the second drive key socket with the second keyway, and the second drive key operatively connecting the second drive key socket with the second keyway. The first drive key, the second drive key, and the third drive key each include a substantially planar drive face slidably engaging the respective keyway, and a radiused, cylindrical back portion rotatably engaging the respective drive key socket, the planar drive face and the cylindrical back portion forming a nominal half-circle, the substantially planar drive face and radiused, cylindrical back portion providing for transfer of torque between the drive shaft and the end housing irrespective of any relative angular offset between the rotational axes of the drive shaft and the end housing over a selected angular range.

This summary is provided to introduce a selection of concepts that are further described below in the detailed description. This summary is not intended to identify key or essential features of the claimed subject matter, nor is it intended to be used as an aid in limiting the scope of the claimed subject matter.

DETAILED DESCRIPTION

Figure 1:
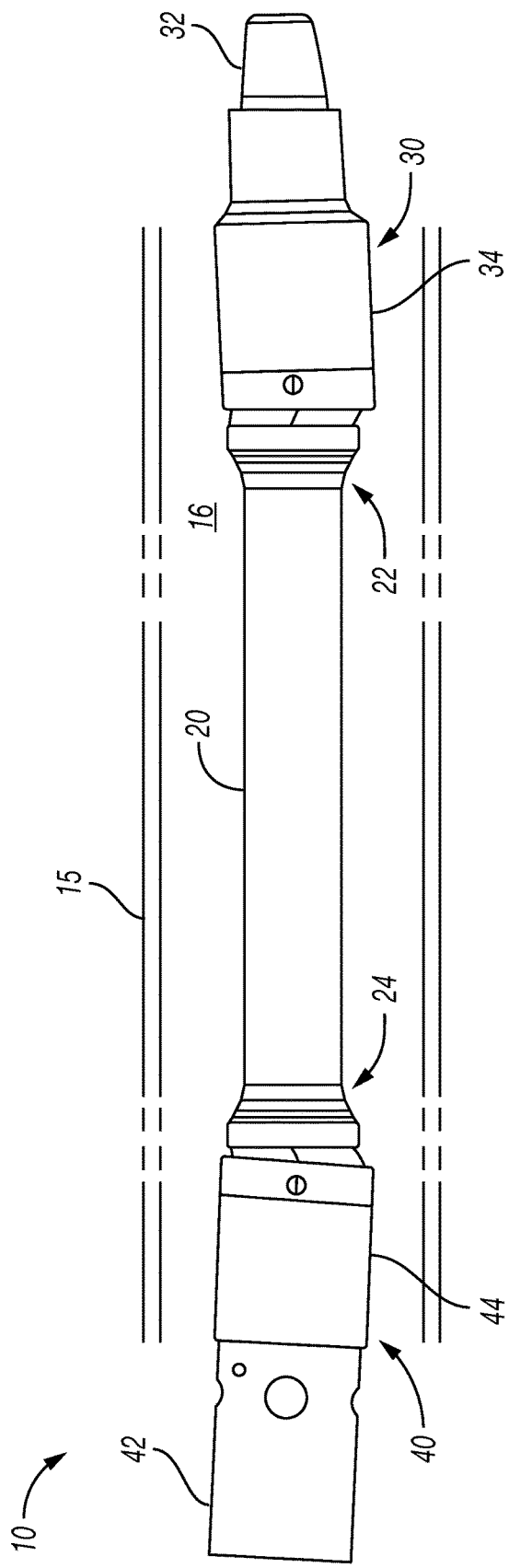
FIG. 1 is a side elevation view of a drive shaft in an earth drilling motor.

One or more embodiments disclosed herein relate generally to universal joints for transmitting torque between rotating shafts having intersecting but non-collinear rotational axes. Universal joints for drive shafts disclosed herein may be associated with downhole motors used in the oil and gas industry for drilling boreholes, especially in applications requiring transfer of large torque and axial thrust loads across the joint.

A drive shaft assembly according to one or more embodiments disclosed herein may include a drive shaft and at least one end housing. The drive shaft has a first end, a second end, a longitudinal rotational axis, and a thrust insert socket located proximate one of the first end and the second end. The end housing has a longitudinal rotational axis and a concave spherical thrust bearing surface. A thrust bearing insert, disposed within the thrust insert socket and having a concave spherical surface in mating engagement with the convex or concave spherical thrust bearing surface of the end housing, respectively, may be used to transfer thrust between the drive shaft and the end housing. The drive shaft assembly also includes a mechanism for transferring torque from the drive shaft to the end housing, such as drive keys, bearings, or other forms of gearing to transmit torque between bodies. The mechanism for transferring torque is configured to be operationally effective irrespective of any relative angular offset between the rotational axes of the drive shaft and the end housing over a selected angular range, such as from 0° (aligned axes of rotation) to about 10° in some embodiments, or up to about 5° in other embodiments. The thrust bearing insert, formed from material selected from the group consisting of a copper-nickel-tin alloy, an iron-chromium-nickel-manganese-silicon alloy, a copper-beryllium alloy, a cobalt-chromium-tungsten-carbon alloy, a copper-chromium-molybdenum alloy, a copper-chromium-nickel-molybdenum-iron-tungsten alloy, and a nickel-beryllium alloy, may provide for minimal galling and/or spalling, even at high thrust loads.

In some embodiments, the concave or convex spherical thrust bearing surface of the end housing may be provided by a thrust bearing insert that is non-integral and disposed within the end housing. In such embodiments, the end housing thrust bearing insert may advantageously be formed from a material selected from the group consisting of a copper-nickel-tin alloy, an iron-chromium-nickel-manganese-silicon alloy, a copper-beryllium alloy, a cobalt-chromium-tungsten-carbon alloy, a copper-chromium-molybdenum alloy, a copper-chromium-nickel-molybdenum-iron-tungsten alloy, and a nickel-beryllium alloy.

A drive shaft assembly according to embodiments disclosed herein may include a drive shaft and at least one end housing. The drive shaft has a first end, a second end, a longitudinal rotational axis, a plurality of drive key sockets, and a thrust insert socket located proximate one of the first end and the second end. The end housing has a longitudinal rotational axis, a plurality of circumferentially spaced axial keyways, and a concave spherical thrust bearing surface. A thrust bearing insert, having a stem portion disposed within the thrust insert socket and a convex spherical surface in mating engagement with the concave spherical thrust bearing surface of the end housing, may be used to transfer thrust between the drive shaft and the end housing. A drive key operatively connects each drive key socket with a respective axial keyway for transferring torque from the drive shaft to the end housing. The drive keys may include, among other features: a substantially planar drive face slidably engaging the axial keyway; and a radiused, cylindrical back portion rotatably engaging the drive key socket. The substantially planar drive face and radiused, cylindrical back portion provide for transfer of torque between the drive shaft and the end housing irrespective of any relative angular offset between the rotational axes of the drive shaft and the end housing over a selected angular range, such as from 0° (aligned axes of rotation) to about 10° in some embodiments, or up to about 5° in other embodiments. A split retaining ring and a threaded retainer may be utilized to keep the universal joint from separating during handling or when shock loaded in operation.

Drive shaft assemblies according to embodiments disclosed herein may be used in mud motors for drilling subterranean wellbores. A mud motor comprising a drive shaft assembly according to one or more embodiments herein may be operatively connected to a drill string comprising a drill bit. Passing mud through the mud motor power section results in rotation of the power section rotor, and via the operative connection, transfers torque between the drive shaft and the end housing of the drive shaft assembly.

Referring to FIG. 1, a drive shaft assembly 10 in accordance with embodiments disclosed herein includes a drive shaft 20 having an upper end 22 and a lower end 24, an upper end housing 30, and a lower end housing 40. When assembled within a downhole motor, drive shaft assembly 10 will be enclosed within a tubular drive shaft housing 15, thereby forming an annular space 16 between drive shaft housing 15 and drive shaft assembly 10.

Upper end housing 30 may have a connector section 32, adapted for connection to the output shaft (not shown) of the power section of a downhole motor, and a coaxial socket section 34, adapted to receive upper end 22 of drive shaft 20 and to accommodate omni-directional articulation of drive shaft 20 therein, within a limited range, while transferring rotational torque and axial thrust loads from the output shaft to drive shaft 20. Lower end housing 40 may have a connector section 42, adapted for connection to the mandrel of the bearing section (not shown) of the downhole motor, and a coaxial socket section 44, adapted to receive lower end 24 of drive shaft 20 and to accommodate omni-directional articulation of drive shaft 20 therein, while transferring rotational torque and axial thrust loads from drive shaft 20 to the mandrel (not shown) or the top portion of other drivetrain components disposed between the drive shaft and the drill bit. Connector sections 32 and 42 can be any type of connector known in the art and commonly used to connect drive shafts to mud motors and other downhole components.

Figure 2:
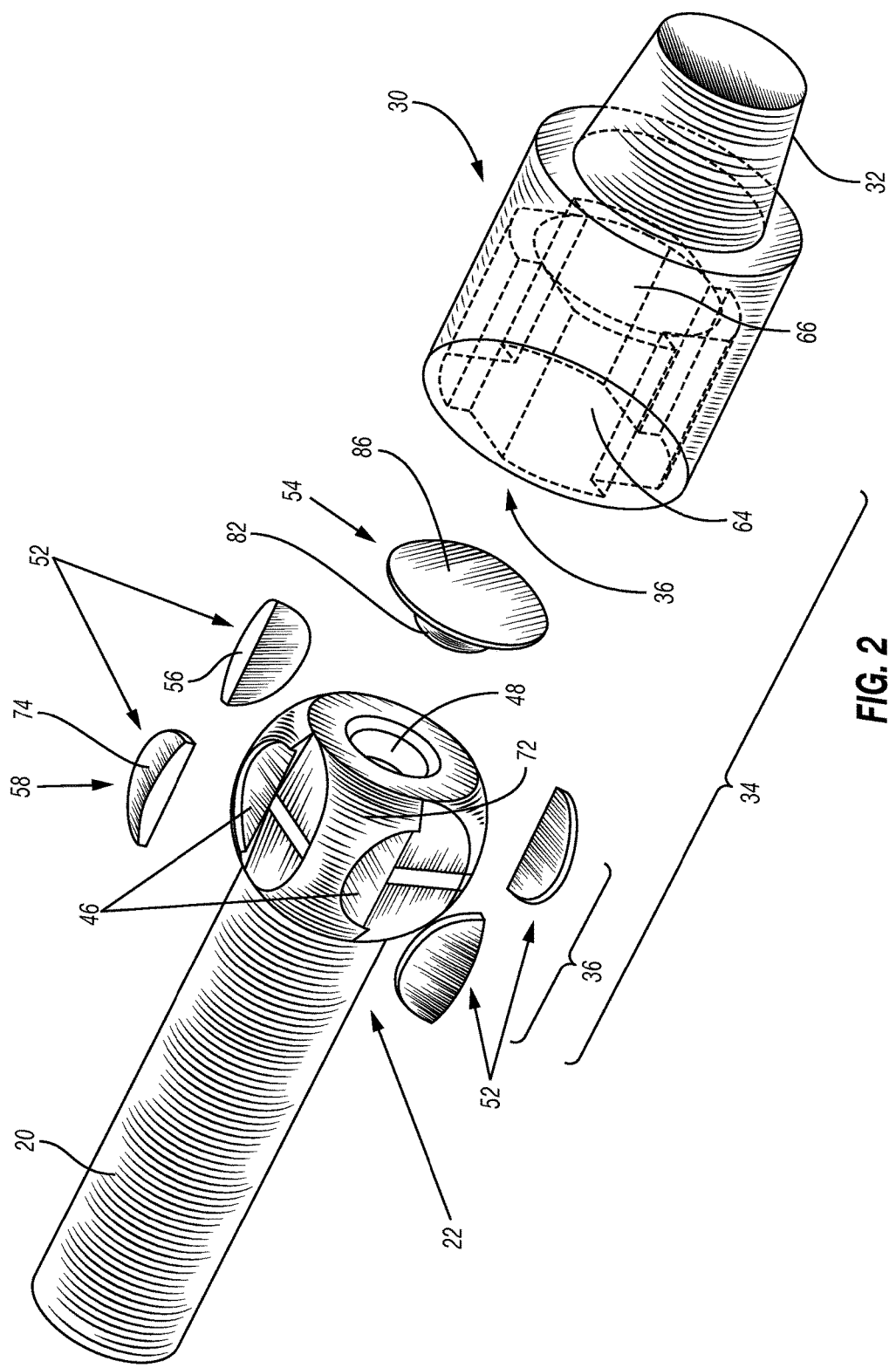
FIG. 2 is an exploded elevation view illustrating the component parts of a universal joint of one or more embodiments of the drive shafts disclosed herein.
Figure 3:
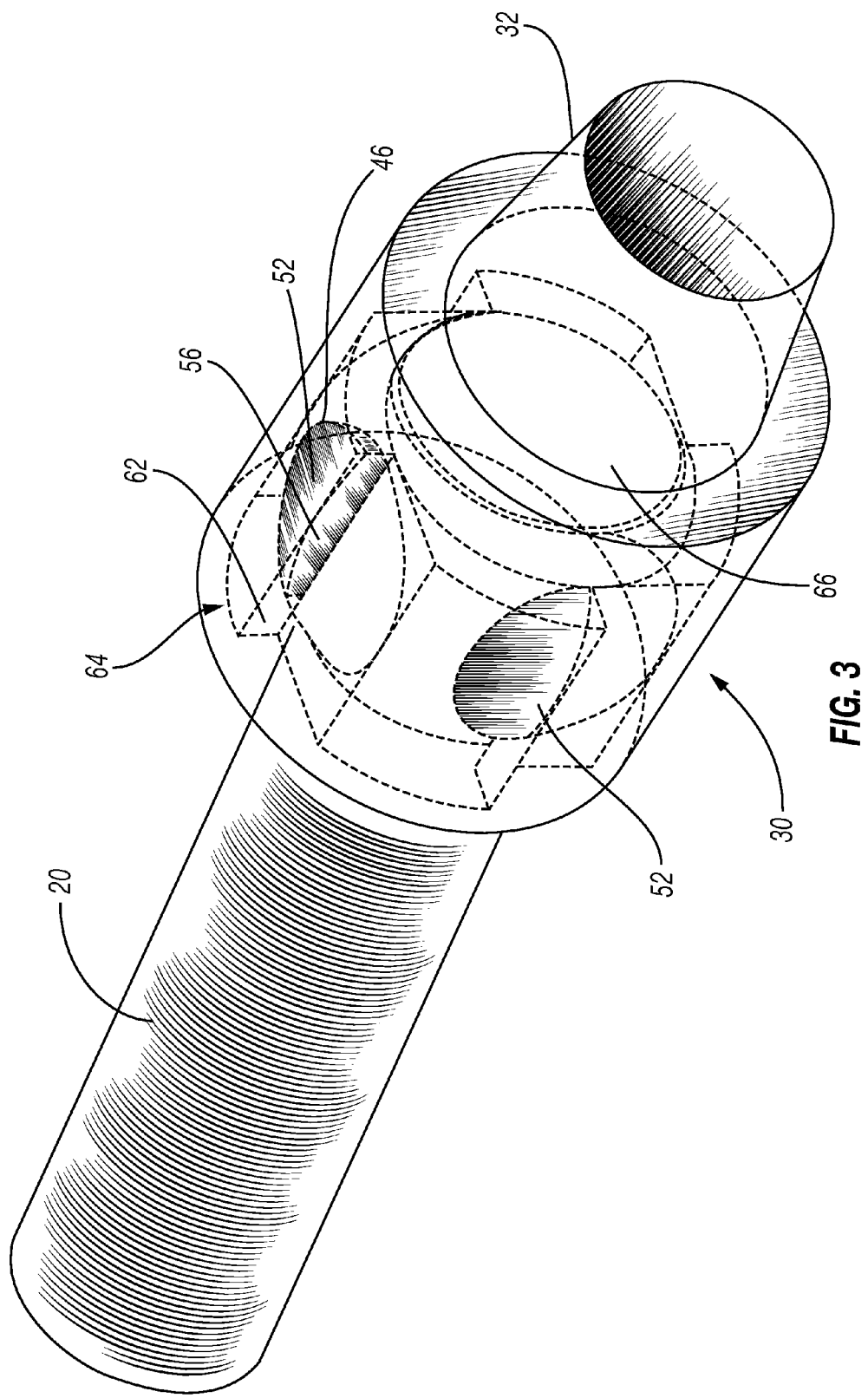
FIG. 3 illustrates the drive shaft of FIG. 2 as assembled.
Figure 4:
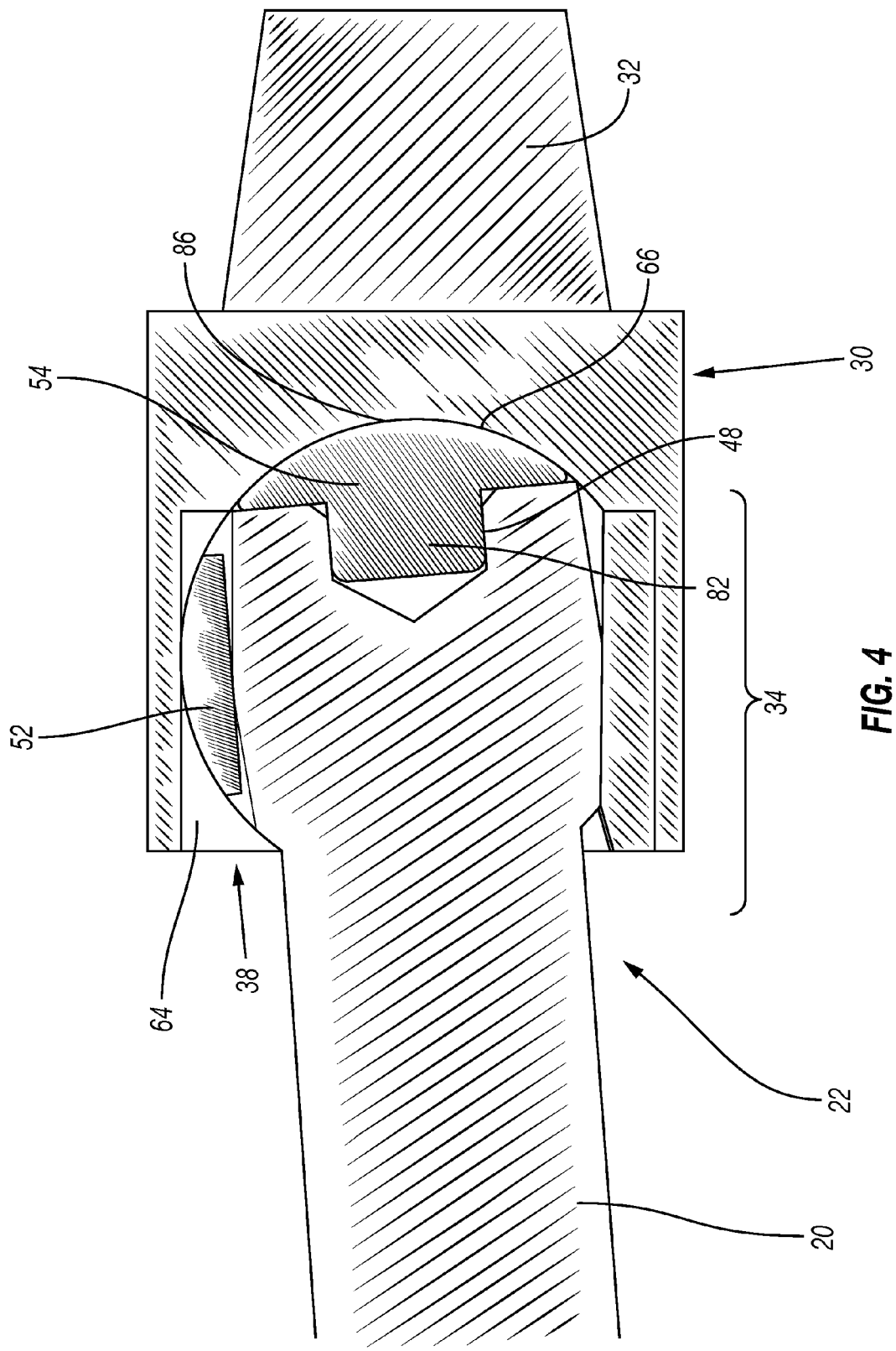
FIG. 4 is a cross-sectional view of an assembled drive shaft assembly according to one or more embodiments disclosed herein.
Figure 5:
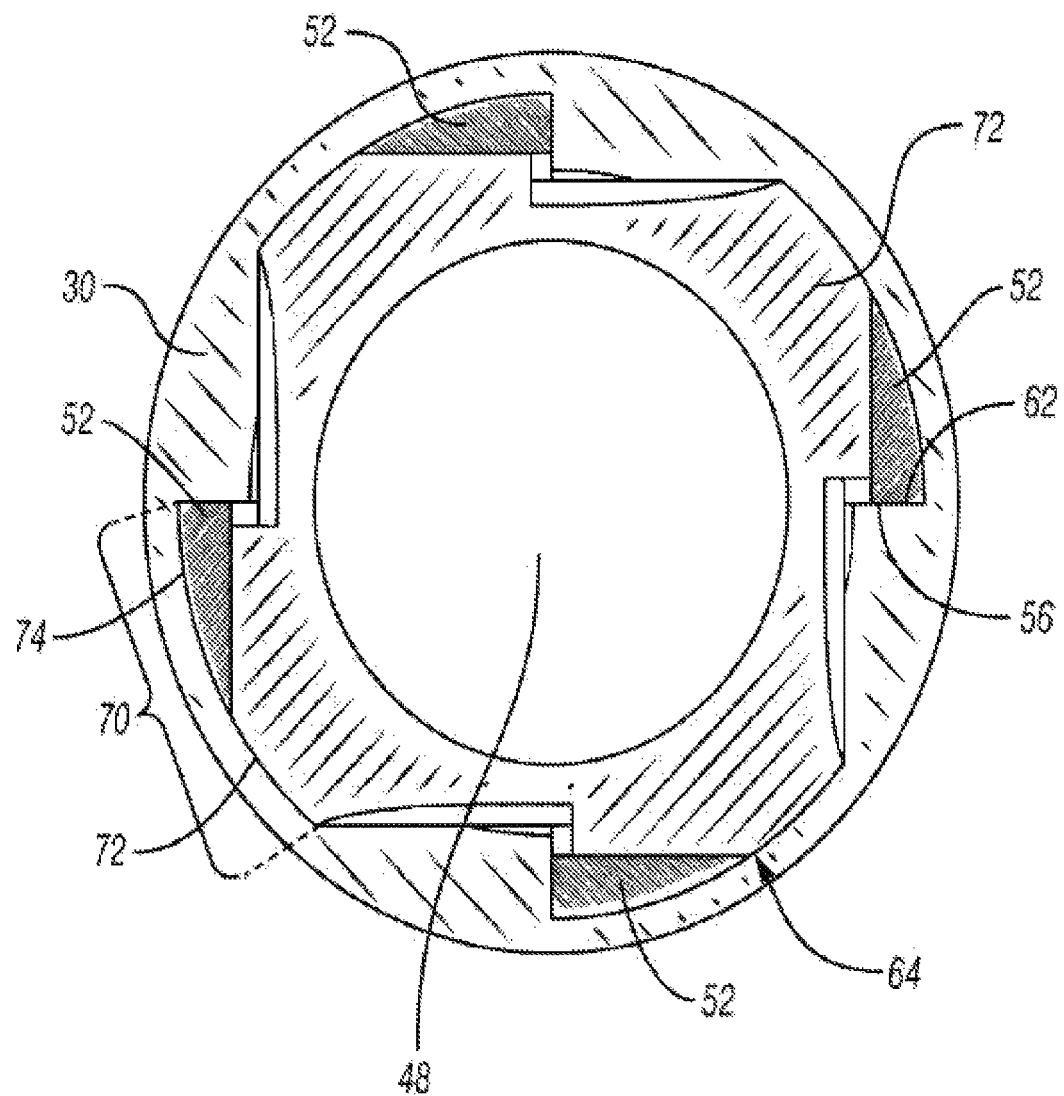
FIG. 5 is an end view of an assembled drive shaft assembly according to one or more embodiments disclosed herein.

Referring now to FIGS. 2-5, where like numerals represent like parts, the connection between drive shaft 20 and socket section 34 of upper housing 30 is illustrated. FIG. 2 is a view illustrating the component parts, assembled as illustrated in FIG. 3. FIG. 4 is a cross-sectional view and FIG. 5 is an end view of the assembled drive shaft assembly. Socket sections 34 and 44 (FIG. 1) may be substantively similar or identical to each other. As such, embodiments of the drive shafts disclosed herein are illustrated in FIGS. 2-5 and described below with reference to only one socket section. The described and illustrated principles and features of the connection of drive shaft 20 to socket section 34 of upper end housing 30 will be equally relevant to the connection of drive shaft 20 to socket section 44 of lower end housing 40 (see FIG. 1).

Upper housing 30 may include an interior surface 38 including a plurality of circumferentially spaced axial keyways 64 and a concave spherical bearing surface 66, which may be integral with housing 30, as illustrated. Alternatively, end housing 30 may include a thrust bearing insert pocket (not shown) in which a bearing insert having a concave spherical bearing surface may be disposed.

Upper end 22 of drive shaft 20 terminates at bearing section 36, which may include components that are integral and non-integral with drive shaft 22. Bearing section 36 may include two or more integrally formed drive key sockets 46 and a cylindrical thrust insert socket 48. Drive key sockets 46 are configured to engage drive keys 52 disposed within the drive key socket 46, and together form a torque transferring module 70 having a spherical outer surface (contiguous surfaces 72, 74, as illustrated in FIG. 5). Bearing section 36 may thus include two or more spherical torque transferring modules 70, each including a drive key socket 46 and a drive key 52.

Drive keys 52 may include a flat drive face 56 and a radiused, cylindrical back portion 58 that allows drive key 52 to swivel in drive key sockets 46. The flat drive face 56 provides for a high contact area between the drive key 52 and the respective mating surface 62 (best shown in FIG. 5) of drive keyways 64. To form the contiguous spherical surfaces, back portion 58 may be radiused axially and/or circumferentially relative to the axis of drive shaft 20, resulting in the outermost radial surfaces 72, 74 of torque transferring module 70 (drive key 52 and the raised back surface of drive key socket 46, respectively) essentially forming a portion of the same sphere. In other words, the cylindrical back portions 58 may be radiused with respect to the drive key rotational axis, such that the outer surface 74 of the cylindrical back portions 58 of the drive keys 52 and the drive shaft 20 proximate the drive key sockets 46 form portions of a common spherical surface. In this manner, drive keys 52 may swivel within drive key sockets 46 while maintaining contact between drive keyway 64 and drive face 56, where contact is essentially maintained over the entire length of drive face 56 and over most of the height of drive face 56, where only minor portions of drive face 56 may come out of contact with mating surface 62 when drive shaft 20 is articulated.

Thrust insert socket 48 may be cylindrical and configured to receive a thrust insert 54. Thrust insert 54 may be "mushroom" shaped, including a stem 82, configured to be disposed in thrust insert socket 48, and a head portion having a convex top surface 86. In some embodiments, convex top surface 86 and surface 72 may form a contiguous spherical surface, similar to that as described above with respect to torque transferring module 70. Additionally, convex top surface 86 and concave bearing surface 66 may have essentially the same radius of curvature.

Bearing section 36 is disposed within upper housing 30 such that the torque transferring members 70 are disposed in keyways 64 and top face 86 of convex spherical thrust member 54 abuts concave bearing surface 66. In operation, socket section 34 provides for omni-directional movement between the drive shaft 20 and upper housing 30 while transferring axial thrust loads and torque loads across the mating bearing sections 36, 38 of the drive shaft 20 and upper housing 30, respectively. Torque may be transferred between the drive shaft 20 and upper housing 30 through the two or more drive keys 52. Thrust may be transferred between the drive shaft 20 and upper housing 30 primarily between convex spherical thrust insert 54 and concave bearing surface 66. Omni-directional movement is provided by the swiveling movement of the drive keys, the mating curved surfaces 66, 86 (concave bearing surface 66 in housing 30 and convex top surface 86 of thrust insert 54), and the axial movement of the torque transmitting members 70 relative to axial drive keyways 64. Even with the complex movement of these parts, contact between drive keyway 64 and the entire length of drive face 56 may be maintained.

As galling may be a concern with the drive keys 52, the thrust insert 54, and the bearing surface 66, which are highly loaded, the drive keys 52, thrust insert 54, and/or bearing surface 66 may be formed from or coated with a hard and/or gall resistant material, such as a copper-nickel-tin alloy (such as TOUGHMET 2CX available from Masterion Corp.), an iron-chromium-nickel-manganese-silicon alloy (such as NITRONIC 60, available from Armco), a copper-beryllium alloy (such as Alloy 25, available from Materion), a cobalt-chromium-tungsten-carbon alloy (such as STELLITE 1 of STELLITE 6, available from Deloro Stellite), a copper-chromium-molybdenum alloy (such as ACUBE 100, available from Carpenter), and a copper-chromium-nickel-molybdenum-iron-tungsten alloy (such as ULTIMET, available from Haynes International), or nickel-beryllium alloys. These materials may each have a galling resistance of over 30,000 psi, as measured by the ASTM G-98 test, such as when using the materials individually or in combination. These materials may better carry and transmit the thrust loads as compared to steel or other materials used to form drive shaft 20 and integral portions of bearing section 36. In one or more embodiments, the drive keys may formed from and/or coated with a tool steel or silicon carbide.

For example, for a 4¾ inch diameter hard rubber (HR) power section, the thrust area of the rotor is about 6.75 square inches. Thus, for a HR power section having eight stages and rated for a pressure drop of about 225 psi per stage, the thrust load would be about 12,150 lb (6.75 in$^2$ thrust area*8 stages*225 psi/stage). Power sections that have an internally contoured profile that supports an even layer of rubber thickness, for example as disclosed in U.S. Pat. No. 6,309,195, are generally rated at an operating pressure of 300 psi per stage, and may exceed 400 psi per stage near stall, so thrust may exceed 15,000 lbs, or even 20,000 lbs. For a thrust insert 54 with a top face 86 having a surface area of about 3.05 in$^2$, and a thrust load of 20,000 lb, the contact stress between concave bearing surface 66 and top face 86 would be about 6,600 psi. This is over the galling threshold of steel-on-steel (which may be between about 2,000 psi to about 5,000 psi) and may be over even that of hardened ball bearings, as typically used in prior drive shaft assemblies. This may be especially true considering the poorly lubricated operating environment and the oscillating nature of the motion of shaft 22 relative to housing 30, which may cause fretting and galling with steel-on-steel. However, the materials of construction listed above for thrust insert 54 are capable of carrying such loads, all embodiments of which are capable of withstanding over 30,000 psi, and some embodiments of which are capable of withstanding contact stresses as high as 75,000 psi.

The above materials used to form thrust inserts 54 may perform well when mated with hardened steel, such as where housing 30 includes an integral concave bearing surface 66. The materials used to form thrust inserts 54 may, however, perform exceptionally when mated with similarly gall resistant materials, such as where housing 30 includes a thrust bearing insert pocket, in which a bearing insert, having a concave spherical bearing surface and formed from a material similar to that used to form the thrust bearing insert, may be disposed.

One or more of the drive keys may have a similar high loading exerted thereupon. For example, a power section with inner contours and even rubber thickness, such as the 500X5683D offered by Roper Pumps, may generate operating torque as high as 6,420 ft-lb and stall torque as high as 9,650 ft-lb in the motor size used in this example. In the mating driveshaft, the drive keys 52 may operate on a mean radius of about 1.2 in and have a length of about 1.5 in, and face contact area of about 0.78 in$^2$. The contact stress on three keys, sharing a load evenly, under these conditions may be over about 27,000 psi. Thus, to prevent galling of the key contact surfaces, in some embodiments, the drive keys 52 may be formed from materials similar to those used for the thrust insert 54.

As described above, drilling fluid passes through annular space 16. Although not illustrated in the accompanying Figures, a seal or sealing assembly, such as a circumferential boot, may be used to prevent drilling fluid from entering socket sections 34, 44, as such could interfere with the operation of the universal joint and potentially cause premature wear of the component parts. Other arrangements for providing a seal between upper housing 30 and drive shaft 20 may also be used.

In one or more embodiments, the thrust insert socket 48 may be formed and sized such that the thrust insert 54 received therein may be capable of limited radial movement within the thrust insert socket 48. For example, in a configuration in which the thrust insert socket 48 and the stem 82 of the thrust insert 54 have a cylindrical shape, the size or diameter of the thrust insert socket 48 may be larger than the size or outer diameter of the stem 82 of the thrust insert 54. In one or more embodiments, the diameter of the thrust insert socket 48 may be about 0.5%, 1%, 2%, or even higher, larger than the outer diameter of the stem 82 of the thrust insert 54.

Such a configuration may enable the thrust insert 54 to move radially, at least partially, within the thrust insert socket 48. As such, this may enable the thrust insert 54 to have a higher-degree-of-freedom and enable a range-of-motion within the thrust insert socket 48, thereby enabling the drive shaft 20 to shift radially when the convex top surface 86 of the thrust insert 54 is contacting and engaged with the concave bearing surface 66 of the upper housing 30. Further, as the drive shaft 20 may then shift radially with respect to the upper housing 30, this may enable the drive keys 52 to move radially or circumferentially with respect to the drive keyways 64 of the upper housing 30. As such, this may improve load-sharing between the flat drive face 56 of the drive keys 52 and the respective mating surface 62 of the drive keyways 64 when the drive shaft 20 is rotating and driving the upper housing 30.

Those having ordinary skill in the art will appreciate that, while the present disclosure depicts one or more embodiments having a drive shaft with four drive keys coupled thereto, the present disclosure is not so limited, as embodiments are contemplated having more or less than four drive keys. As such, in one or more embodiments, a drive shaft assembly in accordance with the present disclosure may include a drive shaft having only and exactly three drive keys, with only and exactly three corresponding drive key sockets and corresponding keyways. The inventors of the present disclosure have found that an embodiment having three drive keys with three respective drive key sockets and keyways may be beneficial when handling and distributing stress loads within the drive shaft assembly.

Particularly, in an embodiment having four or more drive keys, drive key sockets, and keyways, the drive shaft assembly may not be able to evenly distribute the forces and stress received therein amongst the drive keys, drive key sockets, and keyways, such as when the drive shaft moves and articulates with respect to the upper housing. For example, in an embodiment having four drive keys, drive key sockets, and keyways (e.g., a first, second, third, and fourth drive key, drive key socket, and keyway), the drive shaft may move and articulate with respect to the upper housing such that the first drive key and the first drive key socket on one side of the drive shaft rotates to engage a bottom side of the first keyway, in which the third drive key and the third drive key socket on the opposite side of the drive shaft will rotate to engage an upper side of the third keyway. In such a configuration, the second and fourth drive keys and drive key sockets will not engage either the top side or the bottom side of the second and fourth keyways, respectively. This configuration may show an increased amount of force and stress than received by the first and third drive keys, drive key sockets, and keyways, with a decreased amount of force and stress received by the second and fourth drive keys, drive key sockets, and keyways.

Accordingly, to more evenly distribute the forces and stresses received by a drive shaft assembly, the present disclosure contemplates one or more embodiments having exactly three drive keys, drive key sockets, and keyways. In such an embodiment, whenever one drive key and drive key socket is engaging one side of a keyway, the other two of the drive keys and drive key sockets may be engaging the other side of the other keyways. As this arrangement may enable the drive shaft assembly of the present disclosure to more evenly distribute the forces and stresses received therein, the overall wear of the drive shaft assembly may also be reduced.

Figure 6:
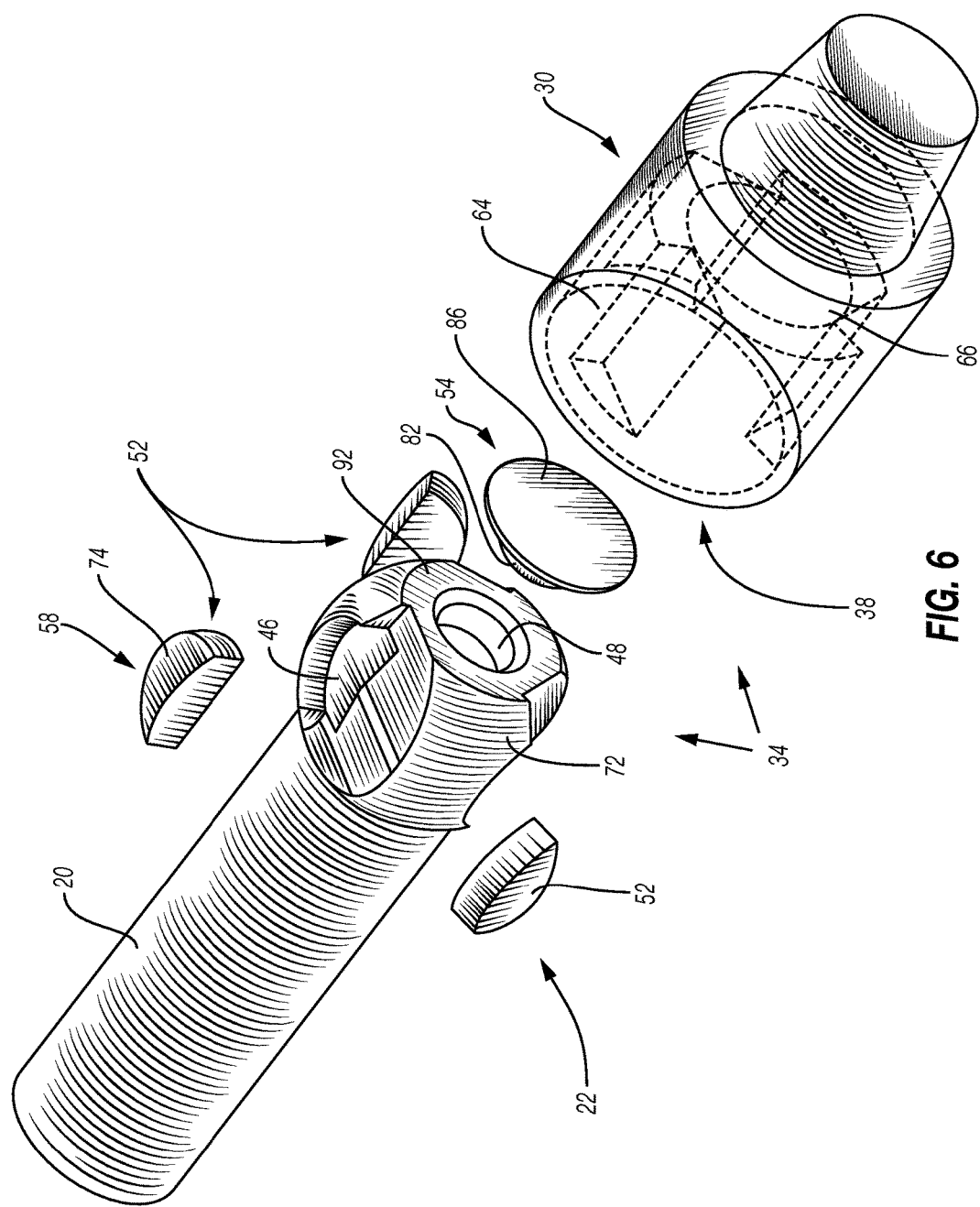
FIG. 6 is an exploded view of a universal joint of a drive shaft in accordance with one or more embodiments disclosed herein.
Figure 7:
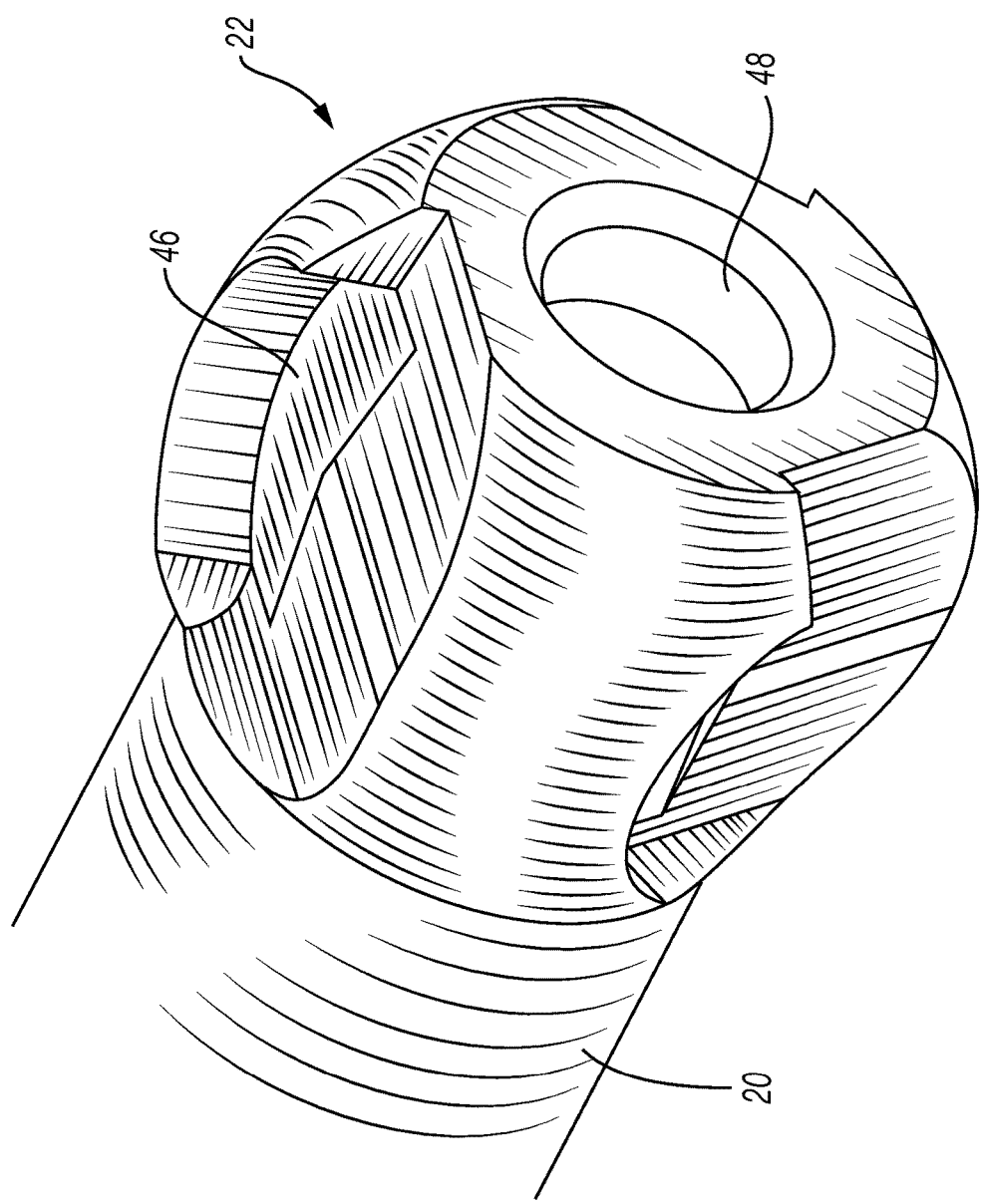
FIG. 7 is an enlarged view of an end of a universal joint of a drive shaft in accordance with one or more embodiments disclosed herein.
Figure 8:
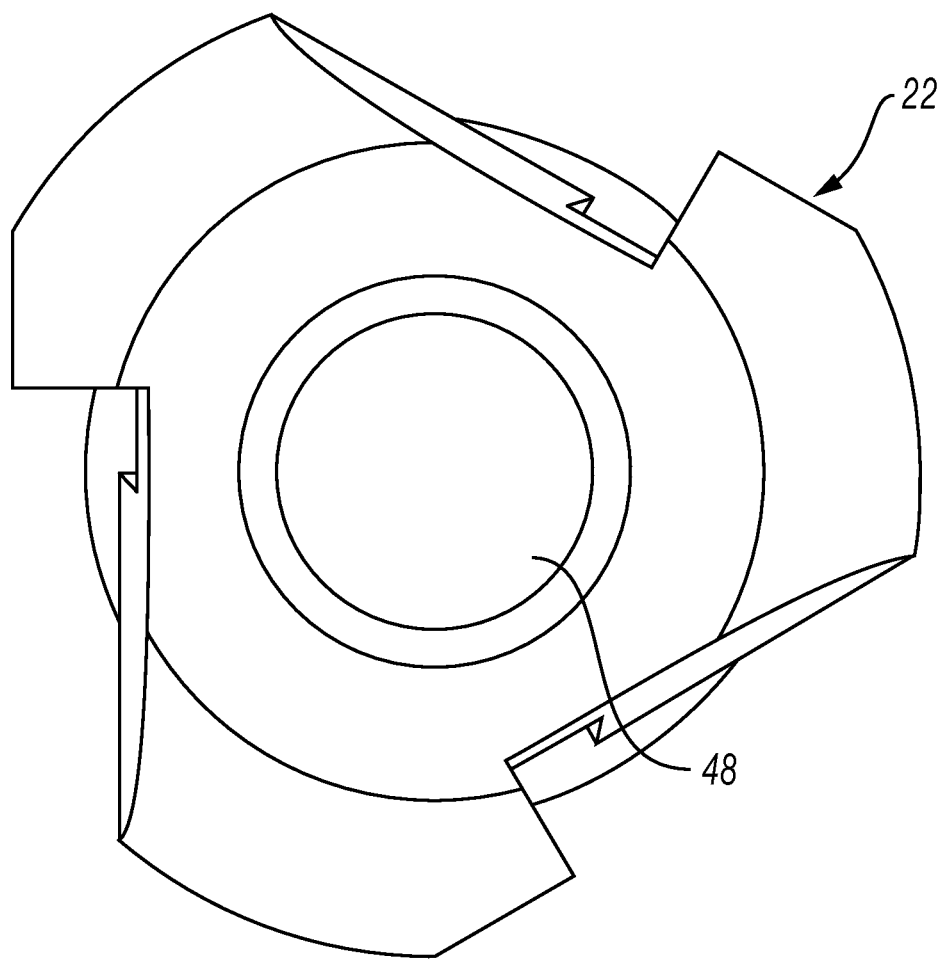
FIG. 8 is an end view of an end of a universal joint of a drive shaft in accordance with one or more embodiments disclosed herein.
Figure 9:
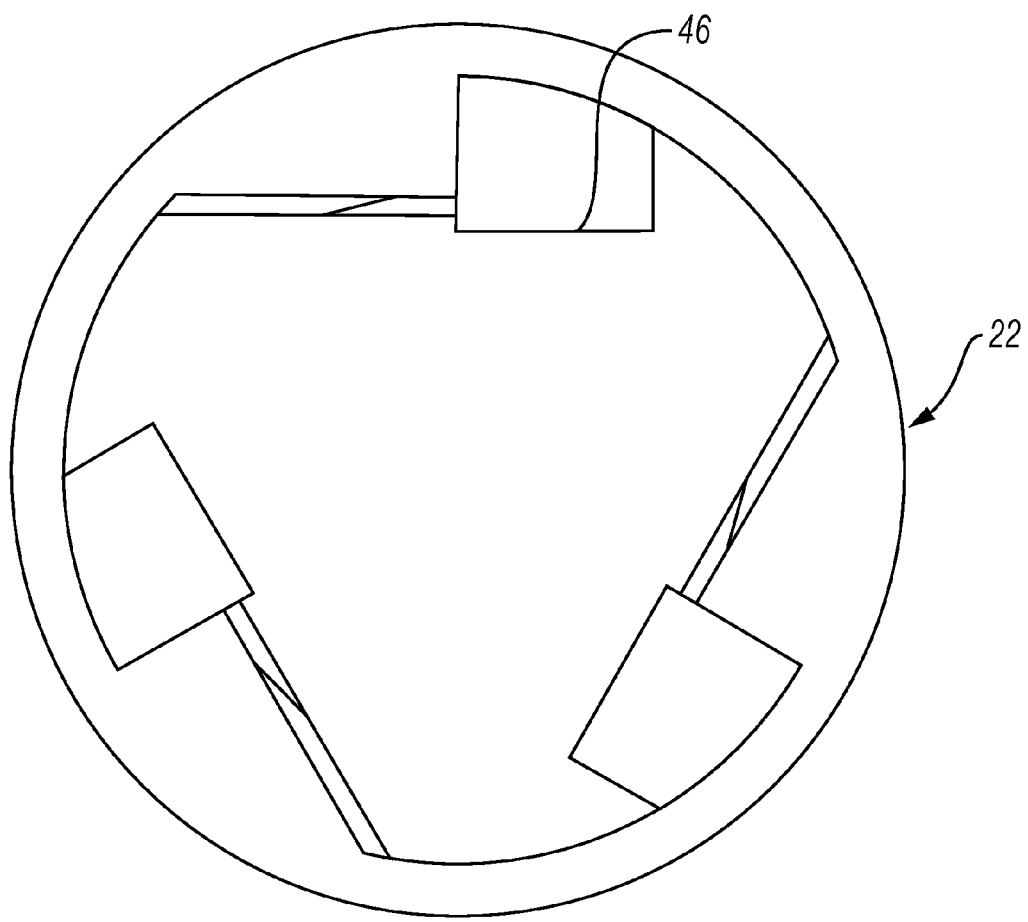
FIG. 9 is a cross-sectional view through an end of a universal joint of a drive shaft in accordance with one or more embodiments disclosed herein. The keys of the universal joint are omitted from this figure for ease of viewing.
Figure 10:
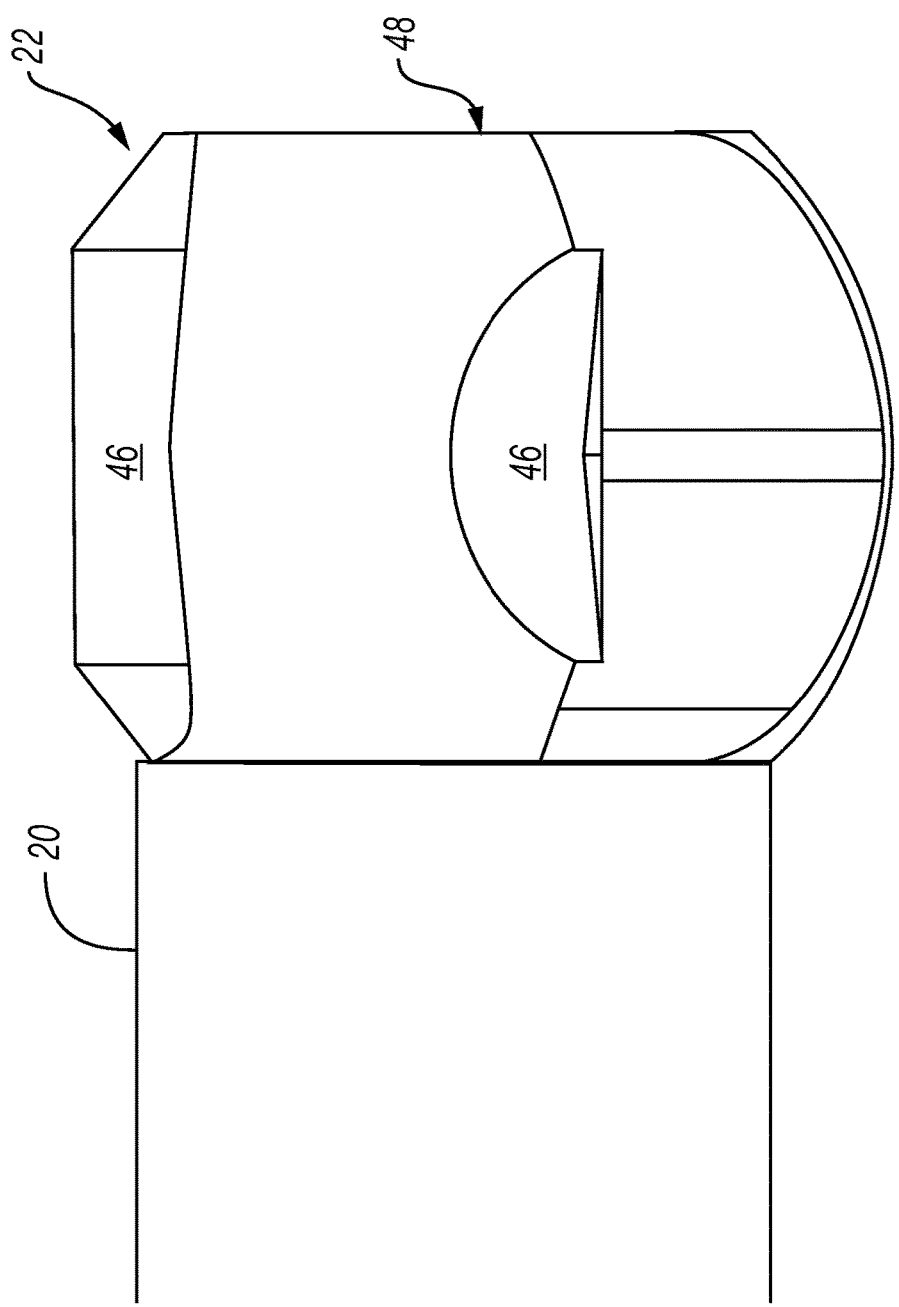
FIG. 10 is an enlarged side view of an end of a universal joint of a drive shaft in accordance with one or more embodiments disclosed herein.

Referring now to FIGS. 6-14, where like numerals represent like parts, the connection between drive shaft 20 and socket section 34 of upper housing 30 is illustrated having three drive keys 52. FIG. 6 shows an exploded view illustrating the component parts, FIG. 7 shows a perspective view of the upper end 22 of the drive shaft 20, FIG. 8 shows an end view of the upper end 22 of the drive shaft 20, FIG. 9 shows a cross-sectional view across the axis of the upper end 22 of the drive shaft 20, and FIG. 10 shows an enlarged view of the upper end 22 of the drive shaft 20.

As with the above embodiments, the drive keys 52 may include a flat drive face 56 and a radiused, cylindrical back portion 58 that allows drive key 52 to swivel in drive key sockets 46. The flat drive face 56 provides for a high contact area between the drive key 52 and the respective mating surface 62 of drive keyways 64. To form the contiguous spherical surfaces, back portion 58 may be radiused axially and/or circumferentially relative to the axis of drive shaft 20, resulting in the outermost radial surfaces 72, 74 of torque transferring module 70 (drive key 52 and the raised back surface of drive key socket 46, respectively) essentially forming a portion of the same sphere. In other words, the cylindrical back portions 58 may be radiused with respect to the drive key rotational axis, such that the outer surface 74 of the cylindrical back portions 58 of the drive keys 52 and the drive shaft 20 proximate the drive key sockets 46 form portions of a common spherical surface. In this manner, drive keys 52 may swivel within drive key sockets 46 while maintaining contact between drive keyway 64 and drive face 56, where contact is essentially maintained over the entire length of drive face 56 and over most of the height of drive face 56, where only minor portions of drive face 56 may come out of contact with mating surface 62 when drive shaft 20 is articulated.

Figure 11:
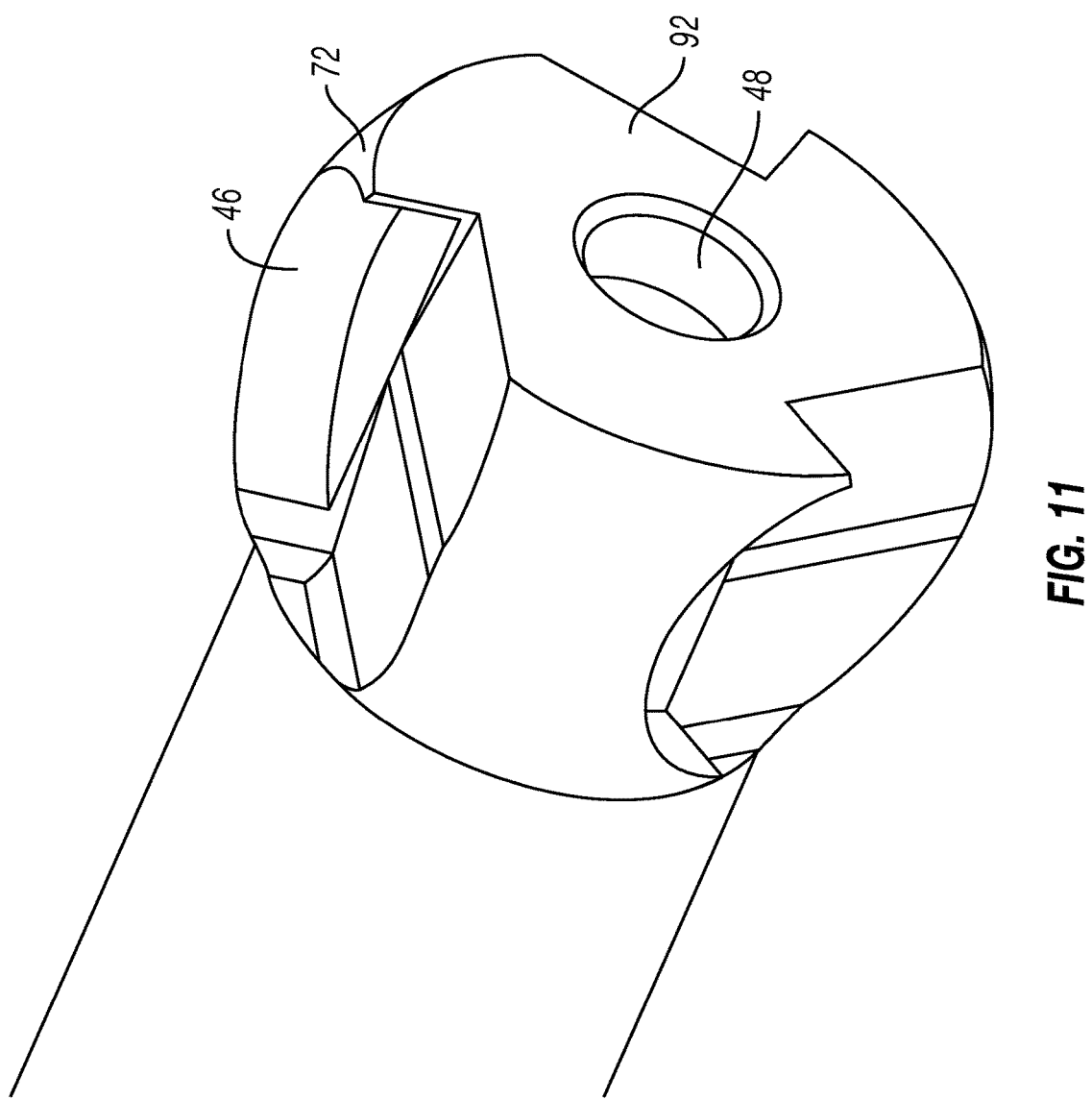
FIG. 11 is an enlarged view of an end of a universal joint of a drive shaft in accordance with one or more embodiments disclosed herein.
Figure 14:
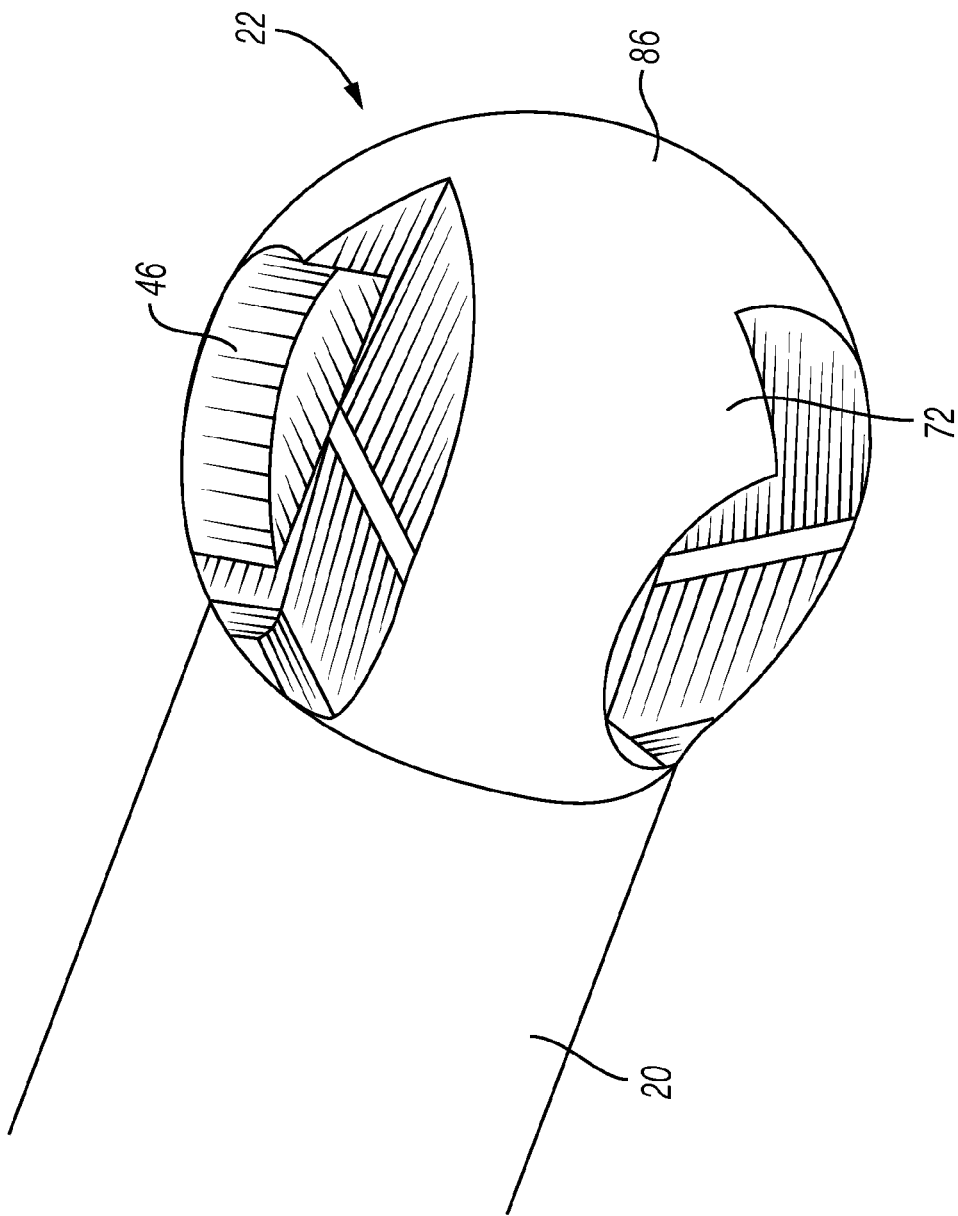
FIG. 14 is an enlarged view of an end of a universal joint of a drive shaft in accordance with one or more embodiments disclosed herein.

Further, the thrust insert socket 48 may be cylindrical and configured to receive a thrust insert 54, in which the thrust insert 54 may include a stem 82, configured to be disposed in thrust insert socket 48, and a head portion having a convex top surface 86. In some embodiments, convex top surface 86 and surface 72 may form a contiguous spherical surface, similar to that as described above with respect to torque transferring module 70. The thrust insert 54, and therefore the thrust insert socket 48 and a support face 92 therefore, may vary in size, such as by increasing or decreasing the size of the thrust insert 54 and the top surface 86 thereof. As such, FIG. 11 shows a view of an embodiment used to receive a larger thrust insert (not shown) than that shown in FIG. 6. As such, the support face 92 adjacent and surrounding the thrust insert socket 48 may be larger to accompany the size of the larger thrust insert. Furthermore, in one or more embodiments, the thrust insert 54 may be formed integrally with the bearing section 36, such as shown in FIG. 14, in which the surface 72 is integral and continuous with the top surface 86 of the upper end 22. Additionally, convex top surface 86 and concave bearing surface 66 may have essentially the same radius of curvature.

Figure 12:
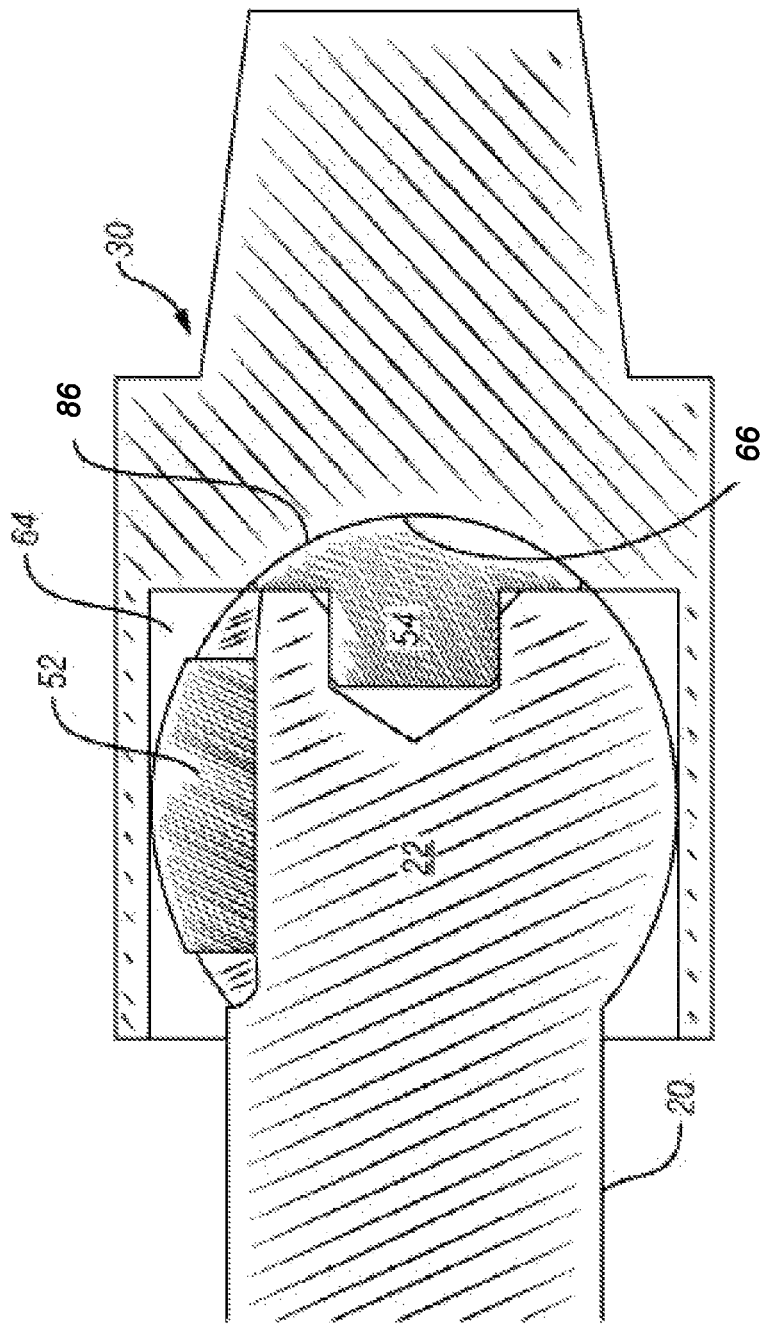
FIG. 12 is a cross-sectional view of an assembled drive shaft assembly according to one or more embodiments disclosed herein.
Figure 13:
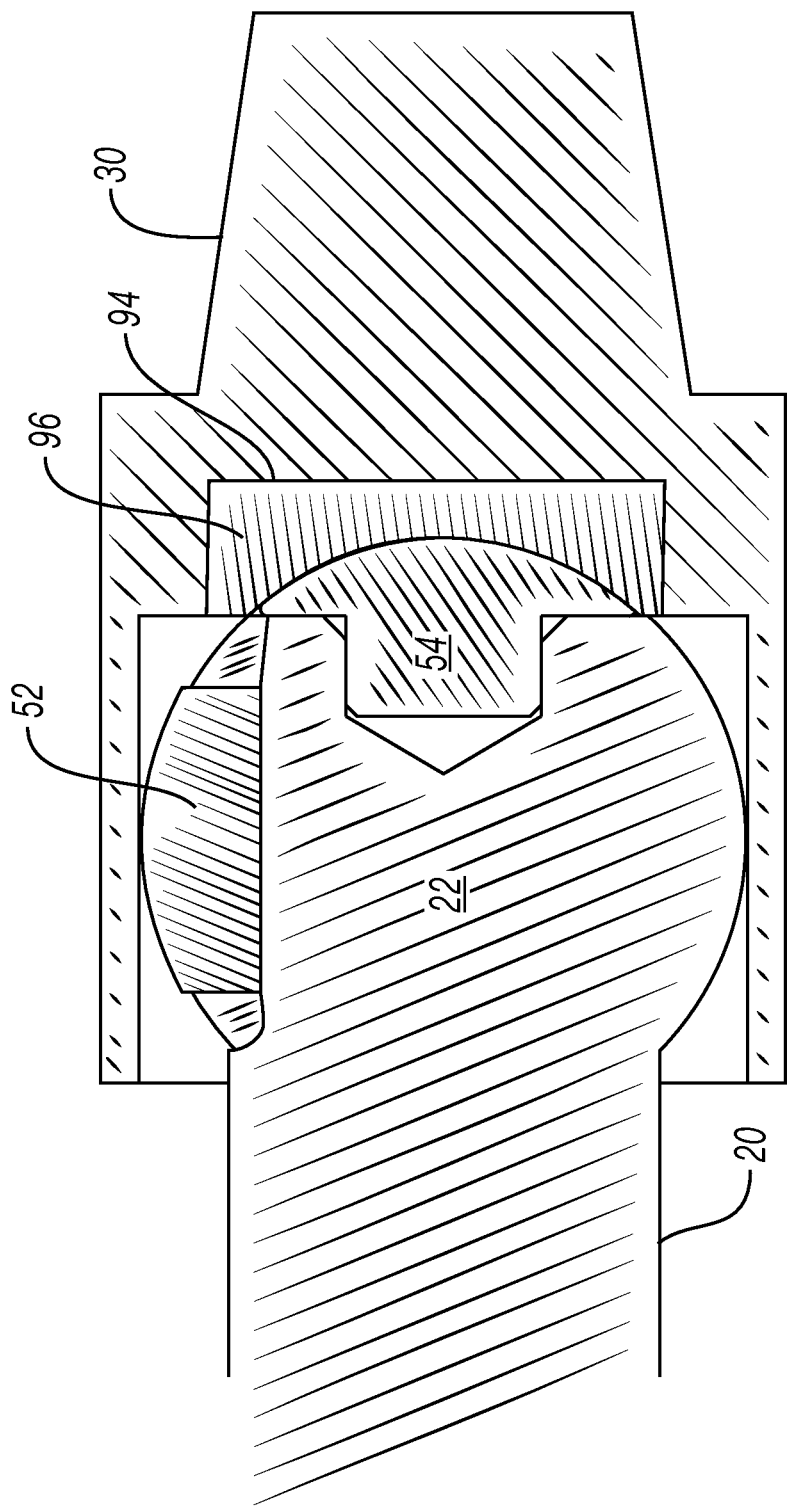
FIG. 13 is a cross-sectional view of an assembled drive shaft assembly according to one or more embodiments disclosed herein.

Referring now to FIG. 12, along with FIGS. 6-10, the upper housing 30 may include an interior surface 38 including a plurality of circumferentially spaced axial keyways 64 and a concave spherical bearing surface 66, which may be integral with housing 30, as illustrated. Alternatively, as shown in FIG. 13, the end housing 30 may include a thrust bearing insert pocket 94 in which a bearing insert 96 having a concave spherical bearing surface may be disposed. As with the above embodiments, the above materials used to form thrust inserts 54 may perform well when mated with hardened steel, such as where housing 30 includes an integral concave bearing surface 66. The materials used to form thrust inserts 54 may, however, perform exceptionally when mated with similarly gall resistant materials, such as where housing 30 includes a thrust bearing insert pocket 94 in which a bearing insert 96, having a concave spherical bearing surface and formed from a material similar to that used to form the thrust bearing insert, may be disposed.

As such, the inventors of the present disclosure have found that even when the universal joint is operating at any articulation angle between the axis of the drive shaft and the axis of the socket, three drive keys may be capable of load sharing regardless of the rotation angle of the drive shaft. However, with a total of four drive keys, for example, when operating at any articulation angle only two can transmit load at a given point in the shaft rotation other than when disposed at about 0, 90, 180, and/or 270 degrees, and with six drive keys, still only three will carry load at a given point in time. Thus, in this design, an optimum number of drive keys may be three. In addition to optimum load-sharing, limiting the number of drive keys to three allows the cross-sectional area of the drive shaft, and thus its torque-carrying capacity, to be maximized.

Using three drive keys may allow the height (such as a height of the drive face 56) of the drive key to be increased, as compared to using four or more keys, for example, without an excessive reduction in driveshaft strength. The height-to-length ratio for a universal joint having three drive keys may be in the range of 0.3 to 0.7 without reducing the strength of the shaft in the key area to a level that is less than that of the main shaft diameter. Increasing key height increases contact area, and correspondingly reduces contact stress and the likelihood of galling. In some embodiments, the height-to-length ratio for the keys of the universal joint may be between about 0.4 and about 0.6.

Figure 15:
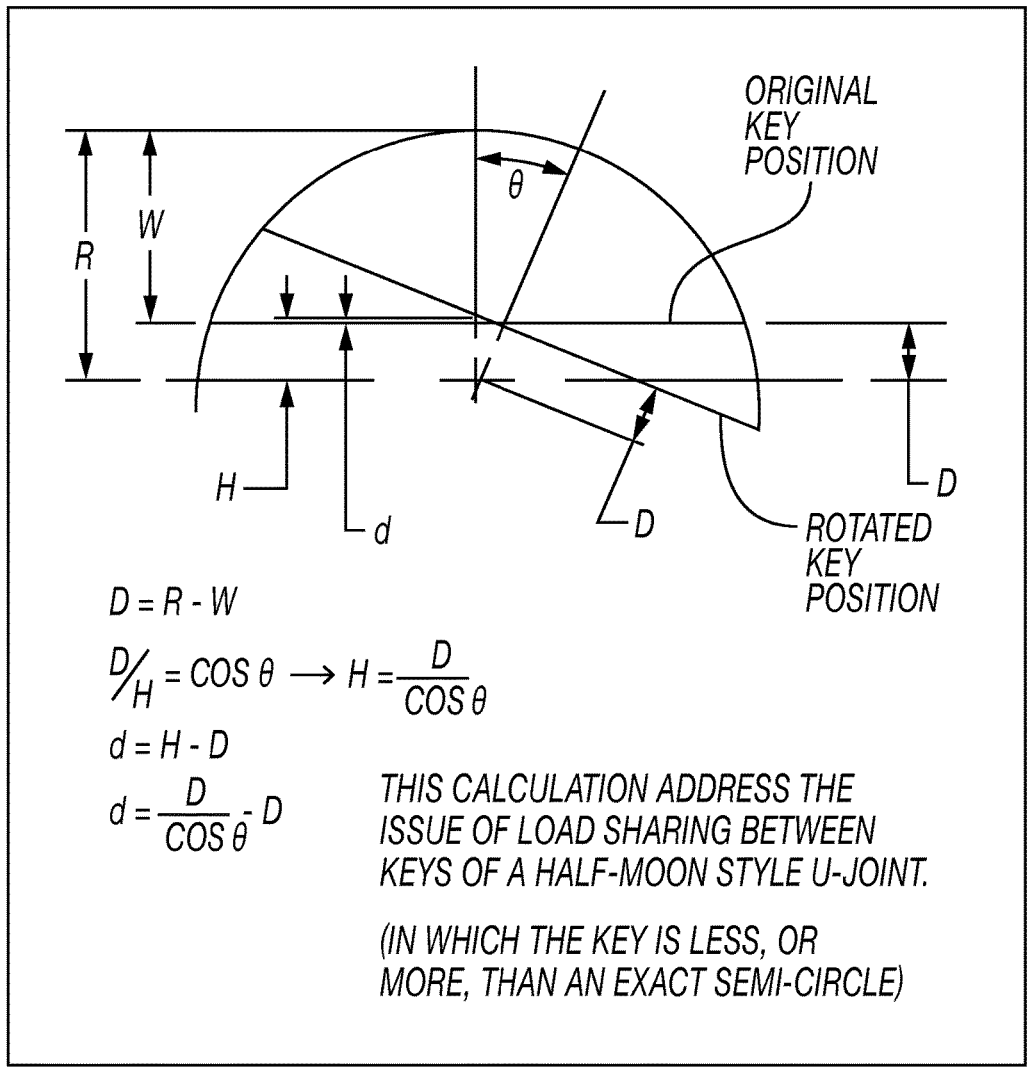
FIG. 15 is a schematic view of a diagram of relative relationships of dimensions of a drive key for an end of a universal joint of a drive shaft in accordance with one or more embodiments disclosed herein.

Further, the pivot axis of each drive key may coincide with, and may be perpendicular with, the central axis of the drive shaft, and the drive key faces and socket drive keyways may be nominally on a plane that intersects the central axis. To meet this requirement, the front face of the drive keys may be nominally coincident with the axis about which the semi-cylindrical back face of the key is radiused. In other words, the theoretical optimum geometry of the key may be exactly half of a circle. If the drive key profile is substantially less, or more, than nominally a half-circle, as the drive key pivots the drive key face may either advance into, or retreat from, the mating socket keyway face, depending on whether the key is on the left or right side of the articulation plane. This condition may then contribute to poor load-sharing between keys, and thus to high contact stress on the drive key faces. Thus, in the nominal length of the key front face may be twice the radius of the semi-cylindrical back face. Material may be added, such as up to as much as about 0.125 in, depending on tool size, to the key face to accommodate for anticipated wear. Thus the newly manufactured drive key profile may comprise slightly more than half a circle. Accordingly, FIG. 15 provides a diagram of relative relationships of dimensions of a drive key in accordance with the present disclosure, in particular if a drive key is manufactured having a drive key profile is substantially less, or more, than nominally a half-circle.

As described above, drive shaft assemblies disclosed herein may include a non-integral spherical thrust insert. The thrust load may thus be distributed over a relatively high contact area. Additionally, being non-integral, the thrust insert may advantageously be formed with different materials, such as a copper-nickel-tin alloy, than the drive shaft, which is typically made using hardened steel.

The use of drive keys having a high contact surface area and a thrust insert advantageously provide for the capacity of drive shaft assemblies according to one or more embodiments disclosed herein to handle the loads from virtually any mud motor power section, including those that generate both high torque and high thrust (i.e., greater than 10,000 lb, 12,000 lb, 15,000 lb, or even greater than 20,000 lb). The drive keys advantageously provide for high torque capacity while the spherical thrust insert provides for high thrust capacity.

Although only a few example embodiments have been described in detail above, those skilled in the art will readily appreciate that many modifications are possible in the example embodiments without materially departing from the disclosure. Accordingly, all such modifications are intended to be included within the scope of this disclosure.

In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke means plus function treatment for any limitations of any of the claims herein, except for those in which the claim expressly uses the words 'means for' together with an associated function.

What is claimed is:

1. A downhole motor drive shaft assembly comprising:
a drive shaft having a first end, a second end, a longitudinal rotational axis, and a thrust insert socket located proximate one of the first end and the second end;
an end housing having a longitudinal rotational axis and an interior surface including a concave spherical thrust bearing surface;
a thrust bearing insert disposed within the thrust insert socket and a convex spherical surface in mating engagement with the concave spherical thrust bearing surface of the end housing; and
a mechanism for transferring torque from the drive shaft to the end housing, the mechanism for transferring torque configured to be operationally effective irrespective of any relative angular offset between the rotational axes of the drive shaft and the end housing over a selected angular range;
the mechanism comprising a plurality of drive keys each having a planar front face, a cylindrical back face, the two faces forming a nominal half-circle, and an outer surface extending between the front face and the back face, the outer surface being radiused as proceeding along the longitudinal axis, and being configured to engage the interior surface of the end housing;
wherein the thrust bearing insert comprises a material selected from the group consisting of a copper-nickel-tin alloy, an iron-chromium-nickel-manganese-silicon alloy, a copper-beryllium alloy, a cobalt-chromium-tungsten-carbon alloy, a copper-chromium-molybdenum alloy, a copper-chromium-nickel-molybdenum-iron-tungsten alloy, and a nickel-beryllium alloy.

2. The assembly of claim 1, wherein the thrust insert comprises a stem portion, and wherein the thrust insert socket and the stem portion are cylindrical.

3. The assembly of claim 1, wherein the spherical thrust bearing surface of the end housing is a portion of a thrust bearing insert non-integral and disposed within the end housing.

4. The assembly of claim 3, wherein the end housing thrust bearing insert comprises a material selected from the group consisting of a copper-nickel-tin alloy, an iron-chromium-nickel-manganese-silicon alloy, a copper-beryllium alloy, a cobalt-chromium-tungsten-carbon alloy, a copper-chromium-molybdenum alloy, a copper-chromium-nickel-molybdenum-iron-tungsten alloy, and a nickel-beryllium alloy.

5. The assembly of claim 4, wherein the ratio of key height to key length is between about 0.3 and about 0.7.

6. The assembly of claim 4, wherein the ratio of key height to key length is between about 0.4 and about 0.6.

7. The assembly of claim 1, wherein the plurality of drive keys comprises exactly three drive keys equally circumferentially spaced from each other about the longitudinal rotational axis.

8. The assembly of claim 1, wherein the outer surface is also radiused as proceeding in a circumferential direction around the longitudinal axis.

9. A downhole motor drive shaft assembly comprising:
a drive shaft having a first end, a second end, a longitudinal rotational axis, a plurality of drive key sockets, and a thrust insert socket located proximate one of the first end and the second end;
an end housing having a longitudinal rotational axis, and an interior surface that defines a plurality of circumferentially spaced axial keyways, and a concave spherical thrust bearing surface;
a thrust bearing insert comprising a stem portion disposed within the thrust insert socket and a convex spherical surface in mating engagement with the concave spherical thrust bearing surface of the end housing; and
a drive key operatively connecting each drive key socket with a respective axial keyway for transferring torque from the drive shaft to the end housing, the drive keys comprising:
a substantially planar drive face slidably engaging the axial keyway;
a back portion rotatably engaging the drive key socket, the back portion defining a cylindrical face configured to contact the drive key socket, and an outer surface configured to contact the interior surface of the end housing, the outer surface being radiused at least as proceeding along the longitudinal axis;
wherein the substantially planar drive face and radiused, cylindrical back face form a nominal half-circle, and
wherein the drive key is configured to transfer torque between the drive shaft and the end housing irrespective of any relative angular offset between the rotational axes of the drive shaft and the end housing over a selected angular range.

10. The assembly of claim 9, wherein the drive key comprises exactly three drive keys equally circumferentially spaced from each other about the longitudinal rotational axis.

11. The assembly of claim 9, wherein the outer surface and the drive shaft proximate the drive key socket form portions of a spherical surface with a common radii center point.

12. The assembly of claim 9, wherein the thrust insert socket and the stem portion are cylindrical.

13. The assembly of claim 9, wherein the concave spherical thrust bearing surface of the end housing is a portion of a thrust bearing insert non-integral and disposed within the end housing.

14. The assembly of claim 13, wherein the end housing thrust bearing insert comprises a material selected from the group consisting of a copper-nickel-tin alloy, an iron-chromium-nickel-manganese-silicon alloy, a copper-beryllium alloy, a cobalt-chromium-tungsten-carbon alloy, a copper-chromium-molybdenum alloy, a copper-chromium-nickel-molybdenum-iron-tungsten alloy, and a nickel-beryllium alloy.

15. The assembly of claim 9, wherein the drive key comprises a material selected from the group consisting of tool steel, silicon carbide, a copper-nickel-tin alloy, an iron-chromium-nickel-manganese-silicon alloy, a copper-beryllium alloy, a cobalt-chromium-tungsten-carbon alloy, a copper-chromium-molybdenum alloy, a copper-chromium-nickel-molybdenum-iron-tungsten alloy, and a nickel-beryllium alloy.

16. The assembly of claim 9, wherein the ratio of key height to key length is between about 0.3 and about 0.7.

17. The assembly of claim 9, wherein the ratio of key height to key length is between about 0.4 and about 0.6.

18. A downhole motor drive shaft assembly comprising:
a drive shaft having a first end, a second end, and a longitudinal rotational axis, the drive shaft defining a first drive key socket, a second drive key socket, and a third drive key socket formed in the drive shaft;
an end housing having a longitudinal rotational axis and defining a first keyway, a second keyway, and a third keyway formed in the end housing, the first keyway, the second keyway, and the third keyway circumferentially spaced from each other; and
a first drive key, a second drive key, and a third drive key for transferring torque from the drive shaft to the end housing,
the first drive key operatively connecting the first drive key socket with the first keyway,
the second drive key operatively connecting the second drive key socket with the second keyway, and
the first drive key, the second drive key, and the third drive key each comprising:
a substantially planar drive face slidably engaging the respective keyway;
a back portion comprising a cylindrical surface rotatably engaging the respective drive key socket, and an outer surface extending between the drive face and the cylindrical face, the outer surface configured to engage the interior surface of the housing and being radiused as proceeding along the longitudinal axis,
wherein the planar drive face and the cylindrical back portion form a nominal half-circle, and
wherein the substantially planar drive face and radiused, cylindrical back portion provide for transfer of torque between the drive shaft and the end housing irrespective of any relative angular offset between the rotational axes of the drive shaft and the end housing over a selected angular range.

19. The assembly of claim 18, wherein the drive shaft has a thrust insert socket located proximate one of the first end and the second end and the end housing has a concave spherical thrust bearing surface, the assembly further comprising:
a thrust bearing insert comprising a stem portion disposed within the thrust insert socket and a convex spherical surface in mating engagement with the concave spherical thrust bearing surface of the end housing.

20. The assembly of claim 18, wherein the concave spherical thrust bearing surface of the end housing is a portion of a thrust bearing insert non-integral and disposed within the end housing.

21. The assembly of claim 18, wherein the outer surface of the first drive key, the second drive key, and the third drive key and the drive shaft between the first drive key socket, the second drive key socket, and the third drive key socket form portions of a common spherical surface.

* * * * *